United States Patent
Choi et al.

(10) Patent No.: US 9,180,875 B2
(45) Date of Patent: Nov. 10, 2015

(54) TRANSMISSION SYSTEM OF HYBRID ELECTRIC VEHICLE

(71) Applicant: Hyundai Motor Company, Seoul (KR)

(72) Inventors: Kum Lim Choi, Seoul (KR); Seok Joon Kim, Yongin-si (KR); Kyoung Joo Kim, Yongin-si (KR); Youngjin Park, Suwon-si (KR); Jae Wang Lee, Hwaseong-si (KR); Keunseok Lee, Hwaseong-si (KR); Baekyu Kim, Suwon-si (KR); Tae Sic Park, Busan (KR); Jeong Mo Jang, Ansan-si (KR); Jinkuk Cho, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 58 days.

(21) Appl. No.: 14/132,998

(22) Filed: Dec. 18, 2013

(65) Prior Publication Data

US 2015/0099605 A1     Apr. 9, 2015

(30) Foreign Application Priority Data

Oct. 7, 2013    (KR) .......................... 10-2013-0119318

(51) Int. Cl.
| | |
|---|---|
| *B60K 6/365* | (2007.10) |
| *B60W 20/00* | (2006.01) |
| *B60W 10/02* | (2006.01) |
| *B60W 10/06* | (2006.01) |
| *B60W 10/08* | (2006.01) |
| *B60K 6/387* | (2007.10) |
| *B60K 6/44* | (2007.10) |
| *B60K 6/445* | (2007.10) |
| *B60K 6/38* | (2007.10) |

(52) U.S. Cl.
CPC ................ *B60W 20/40* (2013.01); *B60K 6/365* (2013.01); *B60K 6/387* (2013.01); *B60K 6/44* (2013.01); *B60K 6/445* (2013.01); *B60W 10/02* (2013.01); *B60W 10/06* (2013.01); *B60W 10/08* (2013.01); *B60K 2006/381* (2013.01); *Y10S 903/902* (2013.01)

(58) Field of Classification Search
CPC ..... F16H 3/728; F16H 3/54; F16H 2003/447; B60K 6/365; B60K 2006/542; B60K 6/547
See application file for complete search history.

(56) References Cited

U.S. PATENT DOCUMENTS

| | | | |
|---|---|---|---|
| 6,910,981 B2 | 6/2005 | Minagawa et al. | |
| 7,189,177 B2 | 3/2007 | Takasu et al. | |
| 7,300,374 B2 * | 11/2007 | Bucknor et al. | ............... 475/5 |
| 7,794,357 B2 * | 9/2010 | Imamura et al. | ............... 477/4 |
| 7,988,579 B2 * | 8/2011 | Tabata et al. | ............... 475/5 |
| 8,234,025 B2 * | 7/2012 | Conlon et al. | ............... 701/22 |

(Continued)

*Primary Examiner* — Sherry Estremsky
(74) *Attorney, Agent, or Firm* — Morgan, Lewis & Bockius LLP

(57) ABSTRACT

A transmission system for a hybrid electric vehicle includes an input shaft connected to an output side of an engine, first and second motors/generators having a function of a motor and a generator and disposed in a transmission housing, a planetary gear set disposed on the input shaft and including three rotating elements, in which among three rotating elements, a first rotating element is directly connected to the first motor/generator and selectively connected to the input shaft and the transmission housing, a second rotating element is directly connected to the input shaft, and a third rotating element is connected to an output gear and connected to the second motor/generator, and a connection unit disposed at the selective connection part.

17 Claims, 16 Drawing Sheets

(56) References Cited

U.S. PATENT DOCUMENTS

| | | |
|---|---|---|
| 8,430,190 B2 | 4/2013 | Honda et al. |
| 8,475,311 B2 * | 7/2013 | Ren et al. .......................... 475/5 |
| 2009/0023529 A1 * | 1/2009 | Sanji et al. ........................ 475/5 |
| 2009/0098969 A1 * | 4/2009 | Tabata et al. ..................... 475/5 |
| 2010/0227723 A1 * | 9/2010 | Seo et al. .......................... 475/5 |
| 2011/0111906 A1 * | 5/2011 | Kim et al. ......................... 475/5 |

\* cited by examiner

FIG. 2

| Driving mode | | CL1 | BK |
|---|---|---|---|
| EV mode | | | |
| Starting of engine | | | |
| Power split mode | | | |
| Parallel mode | Lock-up driving (1:1) | ● | |
| | OD driving | | ● |

FIG. 9

| Driving mode | | CL1 | CL2 | BK |
|---|---|---|---|---|
| EV mode | | | | |
| Starting of engine | | ● | | |
| Continuous mode | | ● | | |
| Power split mode | | | ● | |
| Parallel mode | Lock-up driving (1:1) | ● | ● | |
| | OD driving | | ● | ● |
| Regenerative braking mode | | | | |

TRANSMISSION SYSTEM OF HYBRID ELECTRIC VEHICLE

CROSS-REFERENCE TO RELATED APPLICATION

The present application claims priority to Korean Patent Application No. 10-2013-0119318 filed on Oct. 7, 2013, the entire contents of which is incorporated herein for all purposes by this reference.

BACKGROUND OF THE INVENTION

1. Field of the Invention

The present invention relates to a transmission system for a hybrid electric vehicle, and more particularly, to a transmission system for a hybrid electric vehicle which implements an electric vehicle (EV) mode, a power split mode, and a parallel mode of lock-up and overdrive (OD) driving.

2. Description of Related Art

Generally, a hybrid electric vehicle is a vehicle which is driven by effectively combining at least two different kinds of power sources.

The hybrid electric vehicle generally uses an engine and a motor/generator, and uses the motor/generator having a relatively better low-speed torque characteristic as a main power source in a low speed and uses the engine having a relatively better high-speed torque characteristic as the main power source in a high speed.

Therefore, since the hybrid electric vehicle stops an operation of the engine using fossil fuel and uses the motor/generator in a low-speed section, the hybrid electric vehicle may have an excellent effect in improvement of fuel efficiency and reduction of exhaust gas.

Further, a transmission system for the hybrid electric vehicle as described above is classified into a single mode type and a multi mode type.

The single mode type may not require connection units, such as a clutch and a brake for transmission control, but may reduce efficiency and reduce fuel efficiency at the time of high-speed driving and require an additional torque multiplication apparatus so as to apply to a large vehicle.

The multi mode type may have increased efficiency at the time of high-speed driving and may be designed to enable torque multiplication, thereby being applied to a medium-large size vehicle.

Recently, the multi mode type is mainly used rather than using the single mode type. Therefore, a research for the multi mode type has been actively conducted.

The transmission system in the multi mode type is configured to include a planetary gear set, a plurality of motors/generators which are used as, a motor, and a generator, a connection unit which controls rotating elements of the planetary gear set, a battery which is used as a power source for the motor/generator, and the like.

The transmission system in the multi mode type has different operation mechanisms depending on a connection configuration of the planetary gear set, the motor/generator, and the connection unit.

Further, since the transmission system in the multi mode type has characteristics of which durability, power transmission efficiency, a size, and the like vary depending on the connection configuration, a research and development for implementing a power transmission mechanism which is more robust, reduces in power loss, and is compact in a field of the transmission system for a hybrid electric vehicle has continued.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission system for a hybrid electric vehicle which uses one clutch and one brake to implement an EV mode, a power split mode having better low-speed driving efficiency, and a parallel mode of lock-up and OD driving having better high-speed driving efficiency so as to use power of an engine in a wide range from middle speed to high speed, thereby promoting improvement in fuel efficiency.

Further, various aspects of the present invention are directed to providing a power transmission apparatus for a hybrid electric vehicle including a power split mode to reduce a capacity of a motor/generator for generation, thereby saving production cost.

In addition, various aspects of the present invention are directed to providing a transmission system for a hybrid electric vehicle additionally applying a clutch to simultaneously implement a continuous mode in addition to an EV mode, a power split mode, a parallel mode, thereby maximizing improvement of fuel efficiency and implementing regenerative braking.

In an aspect of the present invention, a transmission system for a hybrid electric vehicle, may include an input shaft connected to an output side of an engine, first and second motors/generators having a function of a motor and a generator and mounted to a transmission housing, a planetary gear set disposed on the input shaft and including three rotating elements having a first rotating element directly connected to the first motor/generator and selectively connected to the input shaft and the transmission housing, a second rotating element directly connected to the input shaft, and a third rotating element connected to an output gear and connected to the second motor/generator, and a connection unit disposed so as to perform that the first rotating element is selectively connected to the input shaft or the transmission housing.

The third rotating element is selectively connected to the output gear and the second motor/generator.

The planetary gear set is a single pinion planetary gear set and may include a sun gear as the first rotating element, a planetary carrier as the second rotating element, and a ring gear as the third rotating element.

The connection unit may include a first clutch disposed between the first rotating element of the planetary gear set and the input shaft, and a brake disposed between the first rotating element of the planetary gear set and the transmission housing.

Operations of the first clutch and the brake are released in an electric vehicle (EV) mode, starting of the engine, and a power split mode, wherein only the first clutch in lock-up driving of a parallel mode is operated, and wherein only the brake in overdrive (OD) driving of the parallel mode is operated.

The connection unit may include a first clutch disposed between the first rotating element of the planetary gear set and the input shaft, a second clutch disposed between the third rotating element of the planetary gear set and the output gear, and a brake disposed between the first rotating element of the planetary gear set and the transmission housing.

In the connection unit, all the operations of the first and second clutches and the brake are released in the EV mode and a regenerative braking mode, only the first clutch is operated in the starting of the engine and a continuous mode, only the second clutch is operated in the power split mode, the first and second clutches are operated in the lock-up driving of the parallel mode, and the second clutch and the brake are operated in the OD driving of the parallel mode.

The transmission system may further include a reduction gear unit disposed on a midshaft disposed in parallel with the input shaft to reduce and transmit rotating power transmitted from the output gear to a differential between the output gear and a final reduction gear of the differential.

The reduction gear unit may include the midshaft disposed in parallel with the input shaft between the input shaft and the differential, a mid gear disposed on the midshaft to be externally engaged to the output gear, and a drive gear disposed on the midshaft to be externally engaged to the final reduction gear of the differential.

A torsion damper is disposed between the output shaft and the input shaft of the engine.

The first motor/generator is a generation purpose and the second motor/generator is a driving purpose.

In another aspect of the present invention, a transmission system for a hybrid electric vehicle, may include an input shaft connected to an output side of an engine, first and second motors/generators having a function of a motor and a generator and mounted to a transmission housing, a planetary gear set disposed on the input shaft and including a sun gear directly connected to the first motor/generator and selectively connected to the input shaft or the transmission housing, a planetary carrier directly connected to the input shaft, and a ring gear connected to an output gear and connected to the second motor/generator, a connection unit disposed at a selective connection part, and a reduction gear unit disposed on a midshaft disposed in parallel with the input shaft to reduce and transmit rotating power transmitted from the output gear to a differential between the output gear and a final reduction gear of the differential.

The ring gear is selectively connected to the output gear and the second motor/generator.

The connection unit may include a first clutch disposed between the sun gear of the planetary gear set and the input shaft, and a brake disposed between the sun gear the planetary gear set and the transmission housing.

In the connection unit, operations of the first clutch and the brake are released in an electric vehicle (EV) mode, starting of the engine, and a power split mode, only the first clutch is operated in lock-up driving of a parallel mode, and only the brake is operated in an overdrive (OD) driving of the parallel mode.

The connection unit may include a first clutch disposed between the sun gear of the planetary gear set and the input shaft, and a second clutch disposed between the ring gear of the planetary gear set and the output gear, and a brake disposed between the sun gear of the planetary gear set and the transmission housing.

In the connection unit, all the operations of the first and second clutches and the brake are released in the EV mode and a regenerative braking mode, only the first clutch is operated in the starting of the engine and a continuous mode, only the second clutch is operated in the power split mode, the first and second clutches are operated in the lock-up driving of the parallel mode, and the second clutch and the brake are operated in the OD driving of the parallel mode.

The reduction gear unit may include the midshaft disposed in parallel with the input shaft between the input shaft and the differential, a mid gear disposed on the midshaft to be externally engaged to the output gear, and a drive gear disposed on the midshaft to be externally engaged to the final reduction gear of the differential.

A torsion damper is disposed between the output shaft and the input shaft of the engine.

The first motor/generator is a generation purpose and the second motor/generator is a driving purpose.

The planetary gear set is configured of a single pinion planetary gear set.

In further another aspect of the present invention, a transmission system for a hybrid electric vehicle, may include an input shaft connected to an output side of an engine, first and second motors/generators having a function of a motor and a generator and disposed in a transmission housing, a planetary gear set disposed on the input shaft and including a sun gear directly connected to the first motor/generator and selectively connected to the input shaft or the transmission housing, a planetary carrier directly connected to the input shaft, and a ring gear connected to an output gear and connected to the second motor/generator, a first clutch disposed between the sun gear of the planetary gear set and the input shaft, a brake disposed between the sun gear of the planetary gear set and the transmission housing, and a reduction gear unit disposed on a midshaft disposed in parallel with the input shaft to reduce and transmit rotating power transmitted from the output gear to a differential between the output gear and a final reduction gear of the differential, whereby a driving mode including an electric vehicle (EV) mode, a power split mode, and lock-up driving and overdrive (OD) driving of a parallel mode is implemented.

The transmission system may further include a second clutch disposed between the ring gear and the output gear so that the ring gear of the planetary gear set is selectively connected to the output gear and the second motor/generator to implement a driving mode which may include the EV mode, starting of the engine, the power split mode, a continuous mode, the lock-up driving and the OD driving of the parallel mode, and a regenerative braking mode.

Operations of the first clutch and the brake are released in the EV mode and the power split mode, wherein only the first clutch is operated in the lock-up driving of the parallel mode, and wherein only the brake is operated in the OD driving of the parallel mode.

All the operations of the first and second clutches and the brake are released in the EV mode and the regenerative braking mode, wherein only the first clutch is operated in the starting of the engine and the continuous mode, wherein only the second clutch is operated in the power split mode, wherein the first and second clutches are operated in the lock-up driving of the parallel mode, and wherein the second clutch and the brake are operated in the OD driving of the parallel mode.

The reduction gear unit may include the midshaft disposed in parallel with the input shaft between the input shaft and the differential, a mid gear disposed on the midshaft to be externally engaged to the output gear, and a drive gear disposed on the midshaft to be externally engaged to the final reduction gear of the differential.

A torsion damper is disposed between the output shaft and the input shaft of the engine.

The first motor/generator is a generation purpose and the second motor/generator is a driving purpose.

The planetary gear set is configured of a single pinion planetary gear set.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each driving mode of a connection unit which is applied to the transmission system for a hybrid electric vehicle according to the various exemplary embodiments of the present invention.

FIG. 9 is an operation table for each driving mode of a connection unit which is applied to the transmission system for a hybrid electric vehicle according to the various exemplary embodiments of the present invention.

Figure 1:
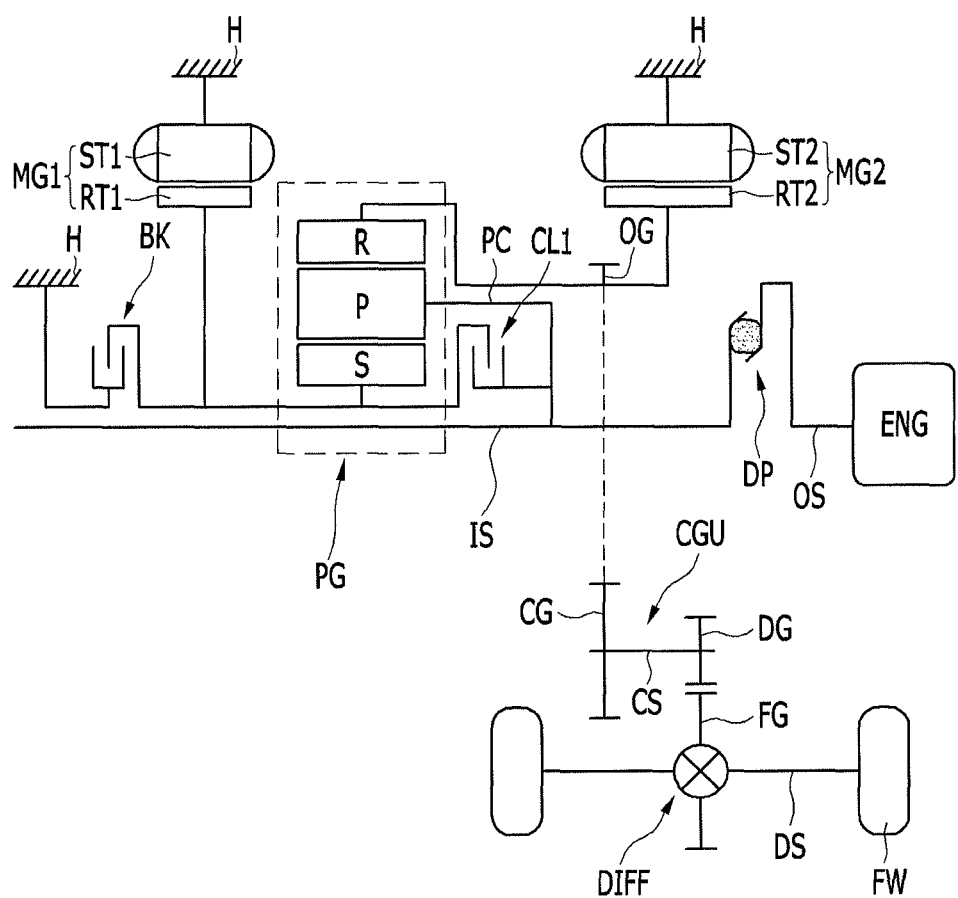
FIG. 1 is a configuration diagram of a transmission system for a hybrid electric vehicle according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Accordingly, the drawings and description are to be regarded as illustrative in nature and not restrictive. Like reference numerals designate like elements throughout the specification.

In the following description, the same components are classified into first, second, and the like to differentiate names for components and a sequence thereof is not necessarily limited thereto.

FIG. 1 is a configuration diagram of a transmission system for a hybrid electric vehicle according to a first exemplary embodiment of the present invention.

Referring to FIG. 1, the transmission system according to the first exemplary embodiment of the present invention shifts power of an engine ENG, which is a power source, and first and second motors/generators MG1 and MG2 depending on a driving state of a vehicle and outputs the shifted power through an output gear OG.

The transmission system includes an input shaft IS, a planetary gear set PG, the first and second motors/generators MG1 and MG2, connection units CL1 and BK, and a reduction gear unit CGU.

The input shaft IS is disposed to receive a driving torque of the engine ENG which is the power source and a torsion damper DP is disposed between an output shaft OS of the engine ENG and the input shaft IS.

The torsion damper DP attenuates or reduces torsional vibration which occurs between the output shaft OS and the input shaft IS of the engine ENG.

The torsion damper DP may be formed of rubber, torsional spring, or the like which may absorb a torsional impact, but is not limited to any one component, and therefore any torsion damper DP which may absorb the torsional vibration occurring between the output shaft OS and the input shaft IS may be used.

The planetary gear set PG, which is a single pinion planetary gear set, includes, as rotating elements, a sun gear S (first rotating element), a planetary carrier PC (second rotating element) which rotatably supports a pinion P externally engaged with the sun gear S, and a ring gear R (third rotating element) internally engaged with the pinion P.

The sun gear S (first rotating element) is selectively connected to the input shaft IS, the planetary carrier PC (second rotating element) is directly connected to the input shaft IS, and the ring gear R (third rotating element) is connected to the second motor/generator MG2 simultaneously with being directly connected to the output gear OS.

The first motor/generator MG1, which is an independent power source, has a function of the motor and generator and in the exemplary embodiment of the present invention, is mainly used as a generator and as a motor at the time of starting the engine.

Further, the first motor/generator MG1 is configured to include a first rotor RT1 and a first stator ST1, in which the first rotor RT1 is directly connected to the sun gear S (first rotating element) of the planetary gear set PG and the first stator ST1 is directly fixed to a transmission housing H.

The second motor/generator MG2, which is an independent power source, has the function of the motor and generator and in the exemplary embodiment of the present invention, is mainly used as a motor.

Further, the second motor/generator MG2 is configured to include a second rotor RT2 and a second stator ST2, in which the second rotor RT2 is directly connected to the output gear OG and the second stator ST2 is directly fixed to the transmission housing H.

The connection unit is configured to include the first clutch CL1 and the brake BK.

The first clutch CL1 is disposed between the sun gear S (first rotating element) of the planetary gear set PG and the input shaft IS and the brake BK is disposed between the sun gear S (first rotating element) of the planetary gear set PG and the transmission housing H.

In this configuration, the first clutch CL1 is used as a variable lock-up unit which selectively connects the sun gear S (first rotating element) of the planetary gear set PG to the planetary carrier PC (second rotating element) so that the planetary gear set PG may be selectively formed as one rotating body and the brake BK fixes the sun gear S (first rotating element) to increase the rotating power input to the planetary carrier PC (second rotating element) and outputs the increased rotating power to the ring gear R (third rotating element) at the time of the driving the over driver.

In the above description, the first clutch CL1 and the brake BK may be configured as a multi-plate type hydraulic friction engaging unit which is friction engaged due to a hydraulic pressure, but the exemplary embodiment of the present invention is not limited thereto.

Meanwhile, the reduction gear unit CGU is externally engaged with the output gear OG by disposing a midshaft CS between the input shaft IS and a differential DIFF to be parallel with the input shaft IS and disposing a mid gear CG at one side of the midshaft CS.

Further, a drive gear DG is disposed at the other side of the midshaft CS to be externally engaged with a final reduction gear (FG) of the differential DIFF.

In this case, the reduction gear unit decelerates the rotating power of the output gear OG and transmits the decelerated rotating power to the final reduction gear FG by allowing a mid gear CG2 to be configured of a large-diameter gear having a diameter larger than that of the drive gear DG.

As known, the differential FDIFF uses or differentiates rotating power reduced and input depending on a gear ratio of the driving gear DG and the final reduction gear FG, depending on a road condition to transmit the rotating power to the front wheel FW through the front drive shaft FDS as it is or transmit the differentiated rotating power to the drive wheel FW (that is, front wheel) through the drive shaft DS FIG. 2 is an operation table for each driving mode of a connection unit which is applied to the transmission system for a hybrid electric vehicle according to the first exemplary embodiment of the present invention.

Referring to FIG. 2, the transmission system for a hybrid electric vehicle according to the first exemplary embodiment of the present invention may implement a driving mode which includes the EV mode, the starting of the engine, the power split mode, and the lock-up driving and the OD driving of the parallel mode.

That is, in the EV mode, the starting of the engine, and the power split mode, both of the first clutch CL1 and the brake BK are released and at the time of the lock-up driving of the parallel mode, the first clutch CL1 is operated and at the time of the OD driving of the parallel mode, the brake BK is operated.

Here, according to the first exemplary embodiment of the present invention, the lock-up driving of the parallel mode is represented by 1:1, which makes the planetary gear set PG be set in the lock-up state depending on the operation of the first clutch CL1 to symbolically represent that a ratio of the input and the output of the planetary gear set PG is set to be 1:1. In terms of the overall transmission system, the meaning of the lock-up driving of the parallel mode includes an under drive UD, 1:1, and an over drive OD which are implemented depending on the gear ratio of the mid gear CG and the drive gear DG of the reduction gear unit engaged with the output gear OG.

Hereinafter, a power transmission system for each driving mode of the transmission system for a hybrid electric vehicle according to the first exemplary embodiment of the present invention will be described with reference to FIGS. 3 to 7.

Figure 3:
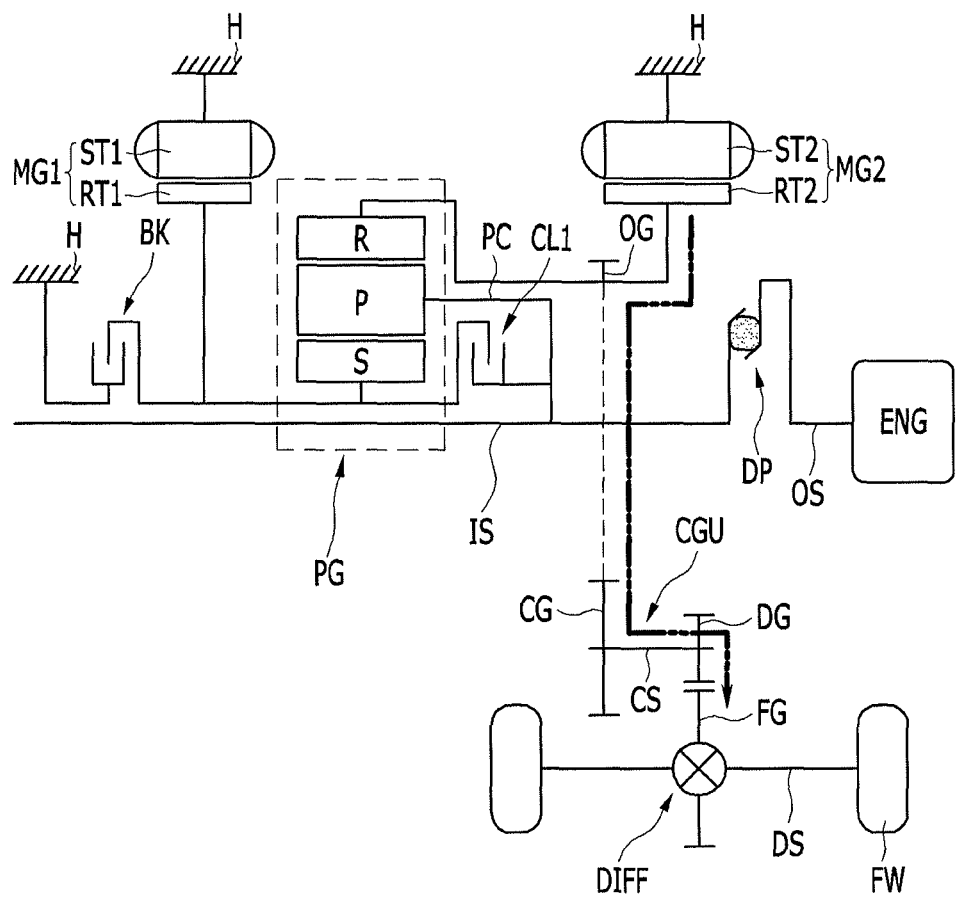
FIG. 3 is a power transmission system diagram in an EV mode of the transmission system for a driving hybrid electric vehicle according to the various exemplary embodiments of the present invention.
Figure 3:
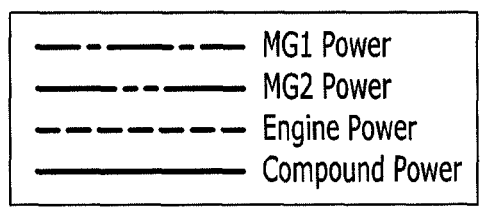

FIG. 3 is a power transmission system diagram in an EV mode of the transmission system for a hybrid electric vehicle according to the first exemplary embodiment of the present invention.

Referring to FIG. 3, in the EV mode, both of the first clutch CL1 and the brake BK are configured not to be operated.

In the EV mode, the engine ENG keeps an operation stopping state, the planetary gear set is not directly involved with the shift, and the output control of the second motor/generator MG2 output to the output gear OG at the same speed is performed.

That is, the rotating power is transmitted to the final reduction gear FG of the differential DIFF through the output gear OG, the mid gear CG, and the drive gear DG by the driving of the second motor/generator MG2 and the rotating power of the second motor/generator MG2 transmitted to the differential DIFF through the final reduction gear FG is used as the input as it is or differentiated depending on a road condition to drive the drive wheel FW through the front wheel drive shaft DS.

Figure 4:
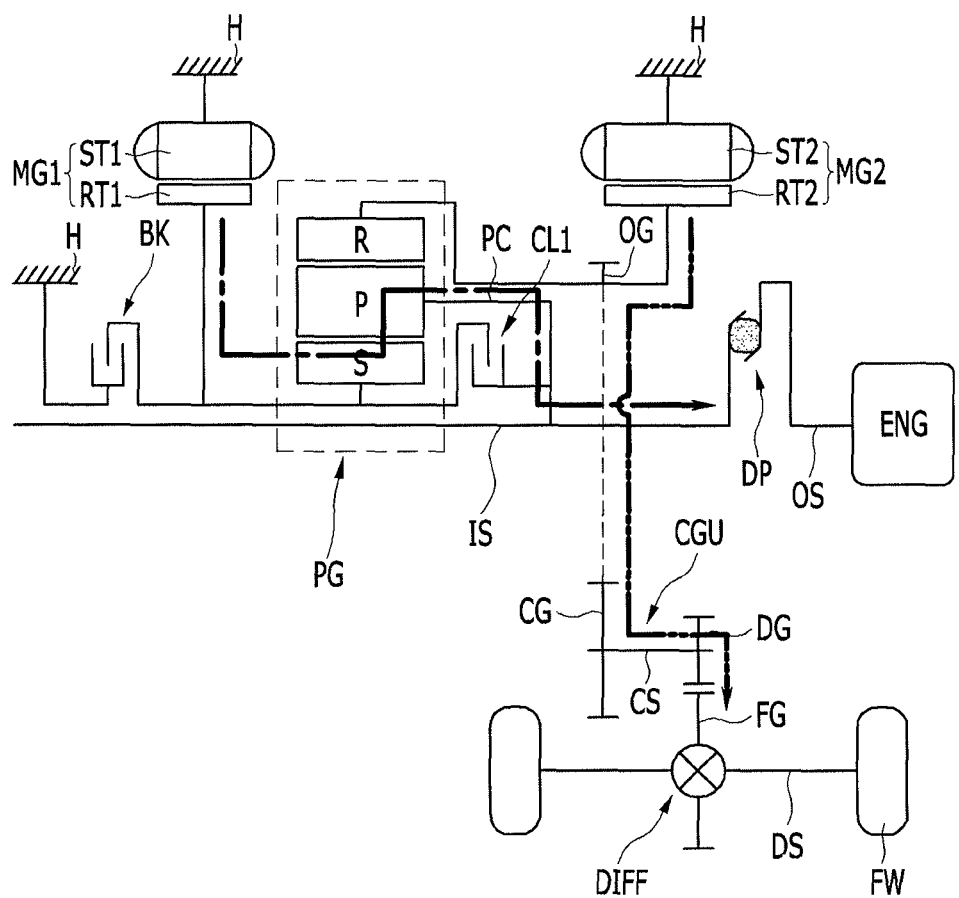
FIG. 4 is a power transmission system diagram at the time of starting an engine of the transmission system for a driving hybrid electric vehicle according to the various exemplary embodiments of the present invention.

FIG. 4 is a power transmission system diagram at the time of starting an engine of the transmission system for a hybrid electric vehicle according to the first exemplary embodiment of the present invention.

Referring to FIG. 4, when the speed of the vehicle in the EV mode state as described above is equal to or more than a set value, the engine ENG starts. In this case, both of the first clutch CL1 and the brake BK are configured not to be operated.

That is, when in the state in which the second motor/generator MG2 is driven in the EV mode state, the first motor/ generator MG1 is rotatably driven in the same direction as the second motor/generator MG2 to perform the input to the sun gear S of the planetary gear set PG, the planetary carrier PC is rotatably driven in the same direction in proportion to the relative speed and the rotating power of the planetary carrier PC drives the engine ENG through the input shaft IS to start the engine ENG.

In addition, after the engine ENG starts, the driving control of the first motor/generator MG1 ends and the engine ENG enters the power split mode.

Figure 5:
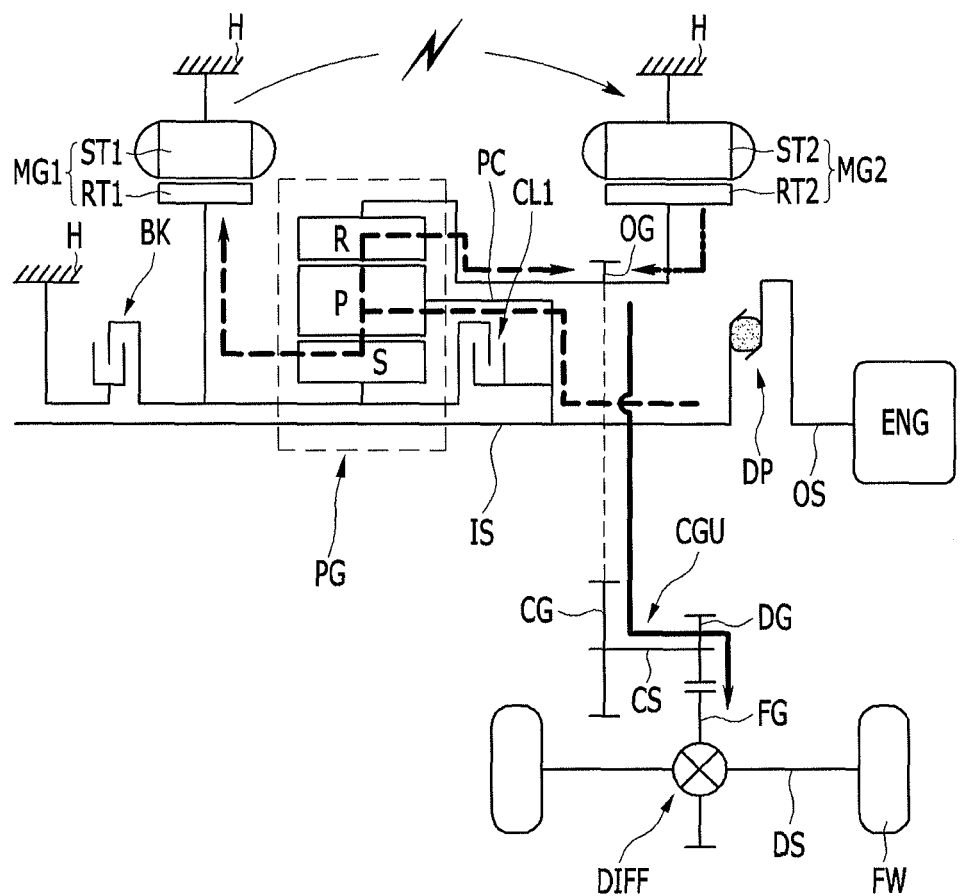
FIG. 5 is a power transmission system diagram in a power split mode of the transmission system for a driving hybrid electric vehicle according to the various exemplary embodiments of the present invention.

FIG. 5 is a power transmission system diagram in a power split mode of the transmission system for a hybrid electric vehicle according to the first exemplary embodiment of the present invention, Referring to FIG. 5, even in the power split mode, both of the first clutch CL1 and the brake BK are configured not to be operated.

In the power split mode, the rotating power of the engine ENG is applied as main power and the rotating power of the second motor/generator MG2 is applied as auxiliary power.

That is, the rotating power of the engine ENG is input to the planetary gear set PG through the input shaft IS and the planetary carrier PC and a portion of the rotating power input to the planetary gear set PG is transmitted to the first motor/generator MG1 through the sun gear S by a complementary operation of each rotating element of the planetary gear set PG and a portion thereof is transmitted to the output gear OG through the ring gear R. At the same time, the rotating power of the second motor/generator MG2 is transmitted to the output gear OG as the auxiliary power.

In this case, the rotating power of the engine ENG may be involved with the generation of the first motor/generator MG1 while a torque remains. That is, in the first motor/generator MG1, the generation is made by the rotating power of the engine ENG transmitted through the planetary gear set PG and the generated electricity is supplied to the second motor/generator MG2 as driving power and the remaining electricity is charged in a battery.

In the power split mode, an electronic-continuous variable transmission is made by an output control of the second motor/generator MG2 directly transmitted to the output gear OG as the auxiliary power, along with the output of the engine ENG transmitted to the output gear OG through the ring gear R as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

Figure 6:
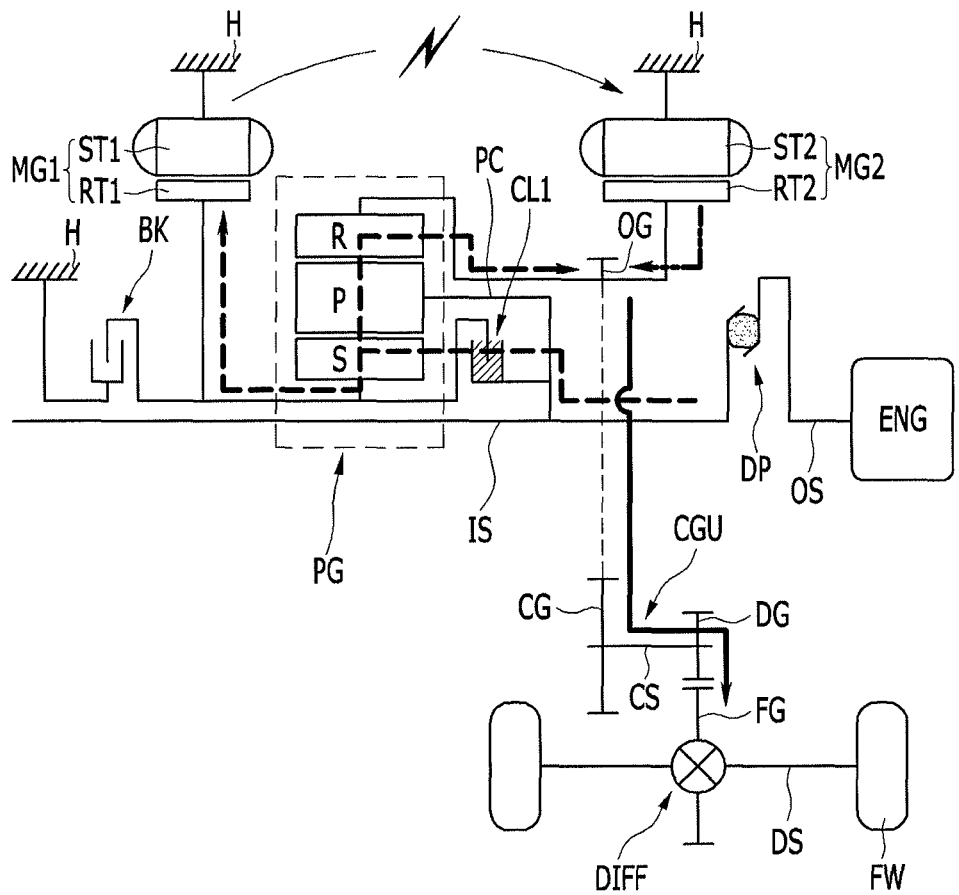
FIG. 6 is a power transmission system diagram in lock-up driving of a parallel mode of the transmission system for a driving hybrid electric vehicle according to the various exemplary embodiments of the present invention.

FIG. 6 is a power transmission system diagram in lock-up driving of a parallel mode of the transmission system for a driving hybrid electric vehicle according to the first exemplary embodiment of the present invention.

Referring to FIG. 6, in the lock-up driving of the parallel mode, the first clutch CL1 is operated.

In the lock-up driving of the parallel mode, the rotating power of the engine ENG is applied as main power and the rotating power of the second motor/generator MG2 is applied as auxiliary power.

That is, in the state in which the planetary gear set PG is locked up by the operation of the first clutch CL1, the rotating power of the engine ENG is transmitted to the output gear OG through the input shaft IS and the planetary gear set PG as the main power of the same speed, and at the same time, the rotating power of the second motor/generator MG2 is transmitted to the output gear OG as the auxiliary power.

In this case, a portion of the rotating power of the engine ENG is involved with the generation of the first motor/generator MG1. That is, in the first motor/generator MG1, the generation is made by the rotating power of the engine ENG transmitted through the locked-up planetary gear set PG and the generated electricity is supplied to the second motor/generator MG2 as driving power and the remaining electricity is charged in a battery.

In the lock-up driving of the parallel mode as described above, the output control of the second motor/generator MG2 directly transmitted to the output gear OG as the auxiliary power is made, along with the lock-up output of the engine ENG transmitted to the output gear OG through the input shaft IS and the locked-up planetary gear set PG as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

Figure 7:
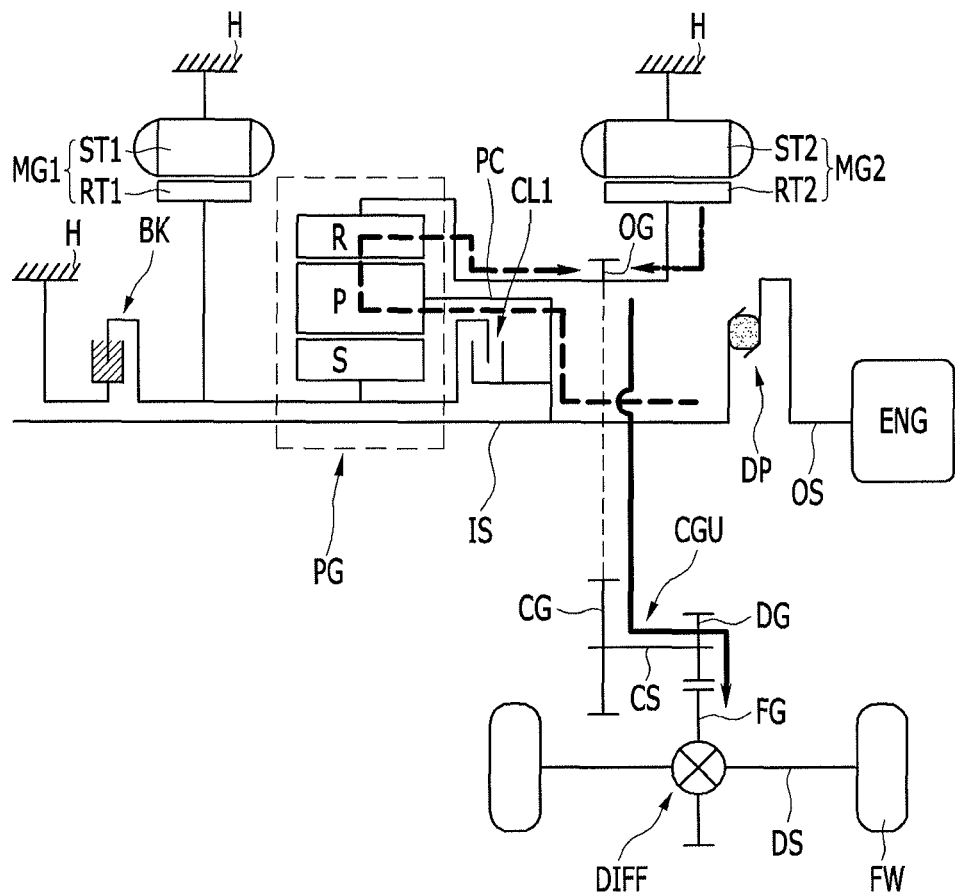
FIG. 7 is a power transmission system diagram in OD driving of the parallel mode of the transmission system for a driving hybrid electric vehicle according to the various exemplary embodiments of the present invention.

FIG. 7 is a power transmission system diagram in OD driving of the parallel mode of the transmission system for a driving hybrid electric vehicle according to the first exemplary embodiment of the present invention.

Referring to FIG. 7, in the OD driving of the parallel mode, the brake BK is operated.

In the OD driving of the parallel mode, the rotating power of the engine ENG is applied as main power and the rotating power of the second motor/generator MG2 is applied as auxiliary power.

That is, by the operation of the brake BK, the rotating power of the engine ENG is input to the planetary carrier PC through the input shaft IS in the state in which in the planetary gear set PS, the sun gear S is operated as a fixed element and is increased by the ring gear R and is transmitted to the output gear OG as the main power. At the same time, the rotating power of the second motor/generator MG2 is transmitted to the output gear OG as the auxiliary power.

In the OD driving of the parallel mode as described above, the output control of the second motor/generator MG2 directly transmitted to the output gear OG as the auxiliary power is made, along with the increased output of the engine ENG transmitted to the output gear OG through the input shaft IS and the planetary gear set PG as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

As described above, in the transmission system for a hybrid electric vehicle according to the first exemplary embodiment of the present invention, all of the engine ENG, the first motor/generator MG1, and the second motor/generator MG2 may generate the driving torque, and the first motor/generator MG1 may use the power of the engine ENG to perform generation and continuously change the transmission ratio of the whole range required in the vehicle by the driving control of the second motor/generator MG2 to improve the fuel efficiency performance.

That is, in the possible structure of the electronic-continuous variable transmission in the power split mode, two motors/generators MG1 and MG2, one clutch CL1 and brake BK are disposed on the input shaft IS to implement the EV mode and the power split mode having the better low-speed driving efficiency and the parallel mode of the lock-up and OD driving having the better high-speed driving efficiency depending on the engagement of the clutch and the brake, thereby maximizing improvement of fuel efficiency.

Further, in the driving mode other than the parallel mode, the engagement of the clutch and the brake is excluded to minimize the application of the working hydraulic pressure of the clutch and the brake, thereby improving the fuel efficiency.

Further, by adding the lock-up driving to the parallel mode, the continuous mode is unnecessary in the high-speed region to improve fuel efficiency and reduce the capacity of the second motor/generator MG2 for driving.

Hereinafter, a configuration of the transmission system for a hybrid electric vehicle according to the second exemplary embodiment of the present invention will be described.

Figure 8:
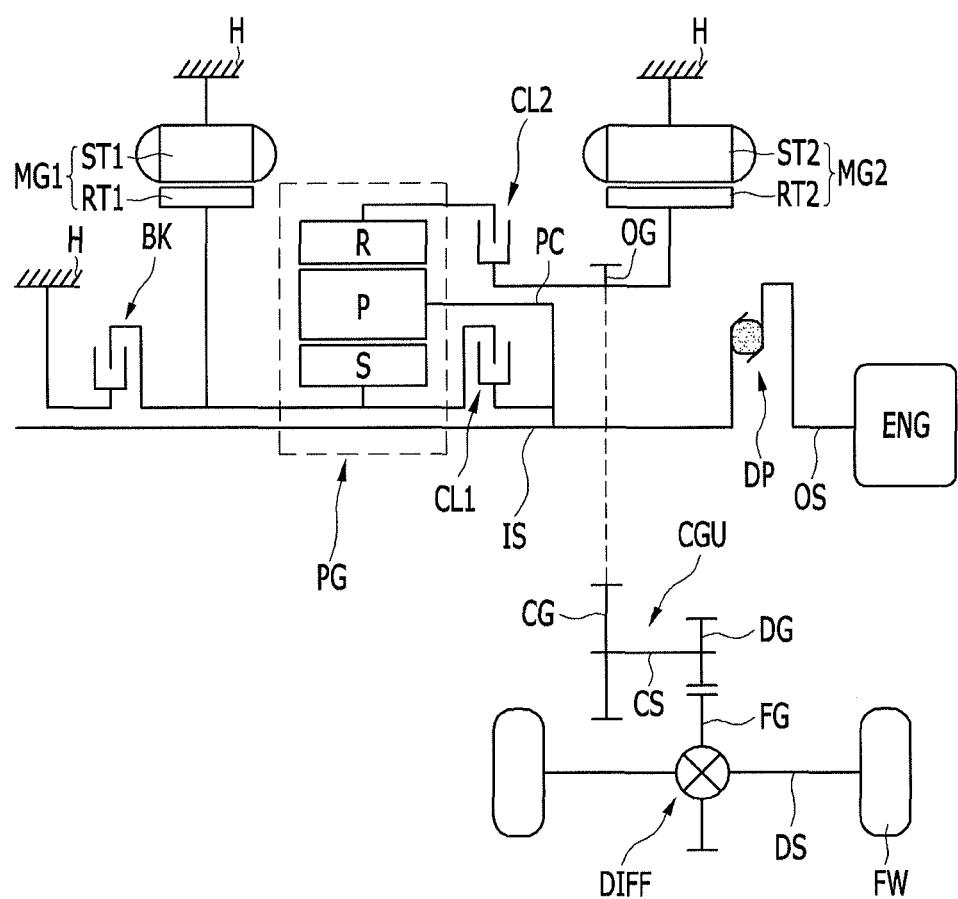
FIG. 8 is a configuration diagram of a transmission system for a hybrid electric vehicle according to various exemplary embodiments of the present invention.

FIG. 8 is a configuration diagram of a transmission system for a hybrid electric vehicle according to the second exemplary embodiment of the present invention.

Referring to FIG. 8, the transmission system for a hybrid electric vehicle according to the second exemplary embodiment of the present invention differs from the first exemplary embodiment of the present invention in that a second clutch CL2 which is a connection unit is additionally disposed between the ring gear R (third rotating element) of the planetary gear set PG and the output gear OG, but other components are the same and therefore the detailed description thereof will be omitted.

As such, the transmission system for a hybrid electric vehicle according to the second exemplary embodiment of the present invention additionally includes the second clutch CL2 to implement a continuous mode and a regenerative braking mode in addition to the driving mode including the EV mode, the starting of the engine, the power split mode, and the lock-up driving and the OD driving of the parallel mode.

FIG. 9 is an operation table for each driving mode of a connection unit which is applied to the transmission system for a hybrid electric vehicle according to the second exemplary embodiment of the present invention.

Referring to FIG. 9, the transmission system for a hybrid electric vehicle according to the second exemplary embodiment of the present invention may implement the driving mode which includes the EV mode, the starting of the engine, the continuous mode, the power split mode, the lock-up driving and the OD driving of the parallel mode, and the regenerative braking mode.

That is, in the EV mode and the regenerative braking mode, all the first and second clutches CL1 and CL2 and the brake BK are released, in the starting of the engine and the continuous mode, only the first clutch CL1 is operated, in the power split mode, only the second clutch CL2 is operated, in the lock-up driving of the parallel mode, the first and second clutches CL1 and CL2 are operated, and in the OD driving of the parallel mode, the second clutch CL2 and the brake BK are operated.

According to the second exemplary embodiment of the present invention, the lock-up driving of the parallel mode is represented by 1:1, which makes the planetary gear set PG be set in the lock-up state depending on the operation of the first clutch CL1 to symbolically represent that a ratio of the input and the output of the planetary gear set PG is set to be 1:1. In terms of the overall transmission system, the meaning of the lock-up driving of the parallel mode includes an under drive UD, 1:1, and an over drive OD which are implemented depending on the gear ratio of the mid gear CG and the drive gear DG of the reduction gear unit engaged with the output gear OG.

Hereinafter, a power transmission system for each driving mode of the transmission system for a hybrid electric vehicle according to the second exemplary embodiment of the present invention will be described with reference to FIGS. 10 to 16.

Figure 10:
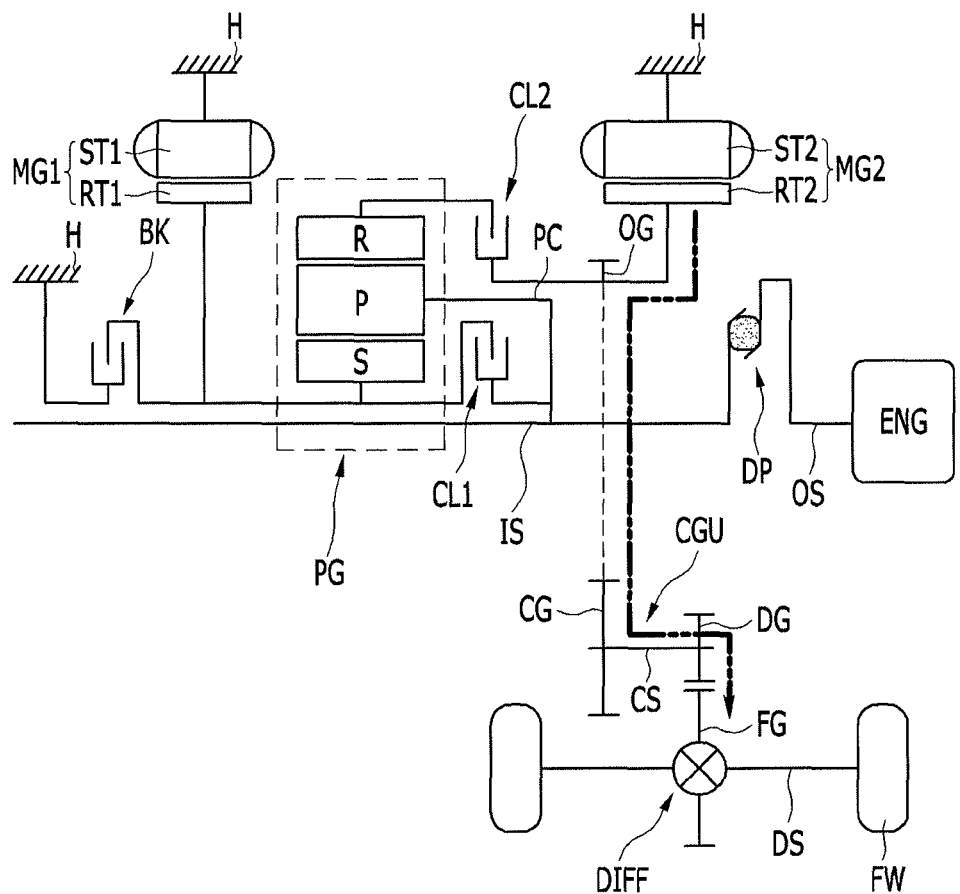
FIG. 10 is a power transmission system diagram in an EV mode of the transmission system for a driving hybrid electric vehicle according to the various exemplary embodiments of the present invention.

FIG. 10 is a power transmission system diagram in an EV mode of the transmission system for a driving hybrid electric vehicle according to the second exemplary embodiment of the present invention.

Referring to FIG. 10, in the EV mode, all of the first and second clutches CL1 and CL2 and the brake BK are configured not to be operated.

In the EV mode, the engine ENG keeps an operation stopping state, the planetary gear set is not directly involved with the shift, and the output control of the second motor/generator MG2 output to the output gear OG at the same speed is performed.

That is, the rotating power is transmitted to the final reduction gear FG of the differential DIFF through the output gear OG, the mid gear CG, and the drive gear DG by the driving of the second motor/generator MG2 and the rotating power of the second motor/generator MG2 transmitted to the differential DIFF through the final reduction gear FG is used as the input as it is or differentiated depending on a road condition to drive the drive wheel FW through the front wheel drive shaft DS.

The EV mode of the transmission system for a hybrid electric vehicle according to the second exemplary embodiment of the present invention releases the operation of the second clutch CL2 to prevent power from being transmitted to the planetary gear set PG, such that the rotating power of the second motor/generator MG2 is directly output without passing through the complicated mechanical elements, thereby increasing the efficiency.

Figure 11:
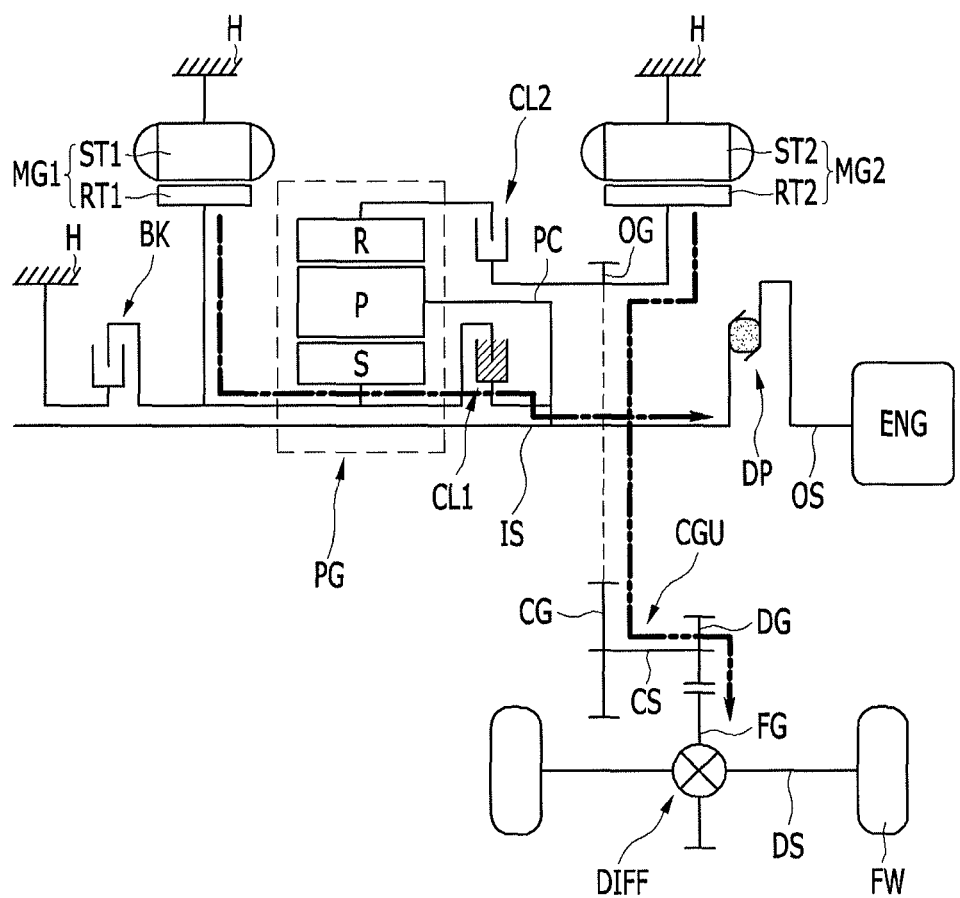
FIG. 11 is a power transmission system diagram at the time of starting an engine of the transmission system for a driving hybrid electric vehicle according to the various exemplary embodiments of the present invention.

FIG. 11 is a power transmission system diagram at the time of starting an engine of the transmission system for a driving hybrid electric vehicle according to the second exemplary embodiment of the present invention.

Referring to FIG. 11, when the speed of the vehicle in the EV mode state as described above is equal to or more than a set value, the engine ENG starts. In this case, only the first clutch CL1 is configured to be operated.

That is, when in the state in which the second motor/generator MG2 is driven in the EV mode state, the planetary gear set PG is in the lock-up state by the operations of the first clutch CL1 and the first motor/generator MG1 is rotatably driven to perform the input to the sun gear G of the planetary gear set PG, the planetary gear set PG rotates as one rotating body to drive the engine ENG through the input shaft IS, thereby starting the engine ENG.

In addition, after the engine ENG starts, the driving control of the first motor/generator MG1 ends and the engine ENG enters the continuous mode.

Figure 12:
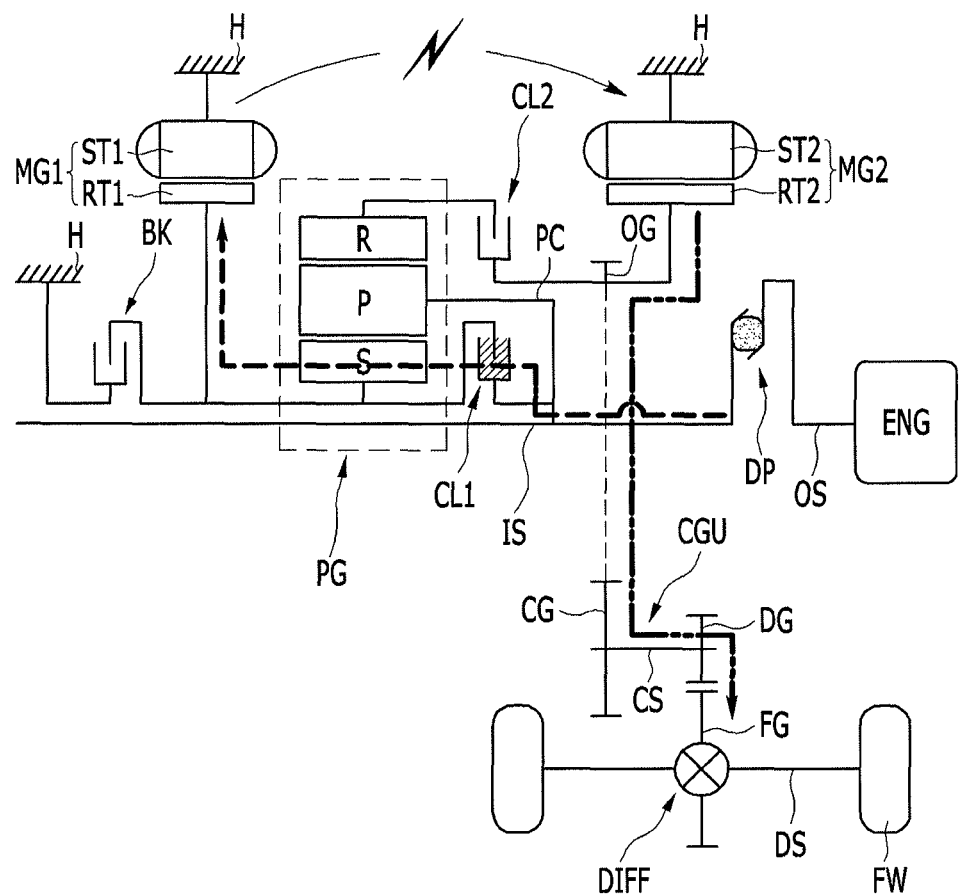
FIG. 12 is a power transmission system diagram in a continuous mode of the transmission system for a driving hybrid electric vehicle according to the various exemplary embodiments of the present invention.
Figure 12:
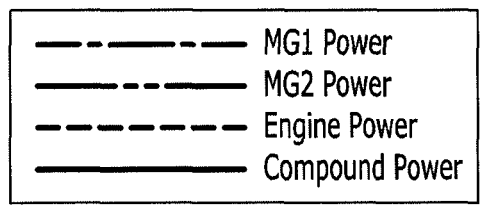

FIG. 12 is a power transmission system diagram in the continuous mode of the transmission system for a driving hybrid electric vehicle according to the second exemplary embodiment of the present invention.

Referring to FIG. 12, even in the continuous mode, only the first clutch CL1 is configured to be operated.

That is, in the continuous mode, the engine ENG is driven in the EV mode to transmit the rotating power to the first motor/generator MG1 and supply the generated electricity of the first motor/generator MG1 as driving power of the second motor/generator MG2.

Even though the engine ENG is driven, the rotating power is not directly used to drive the drive wheel FW and the overall rotating power of the engine ENG is used only for the generation of the first motor/generator MG1.

In the continuous mode, the planetary gear set PG is in the lock-up state by the operation of the first clutch CL1 in the state in which the second motor/generator MG2 and the engine ENG are driven.

Therefore, when the rotating power of the engine ENG is input to the sun gear S of the planetary gear set PG through the input shaft IS, the planetary gear set PG rotates as one rotating body to drive the first motor/generator MG1, thereby performing the generation.

That is, in the continuous mode, the driving of the vehicle is performed by the output control of the second motor/generator MG2 and the driving power of the second motor/generator MG2 uses the generated electricity in the first motor/generator MG1 and the remaining electricity is charged in the battery.

Figure 13:
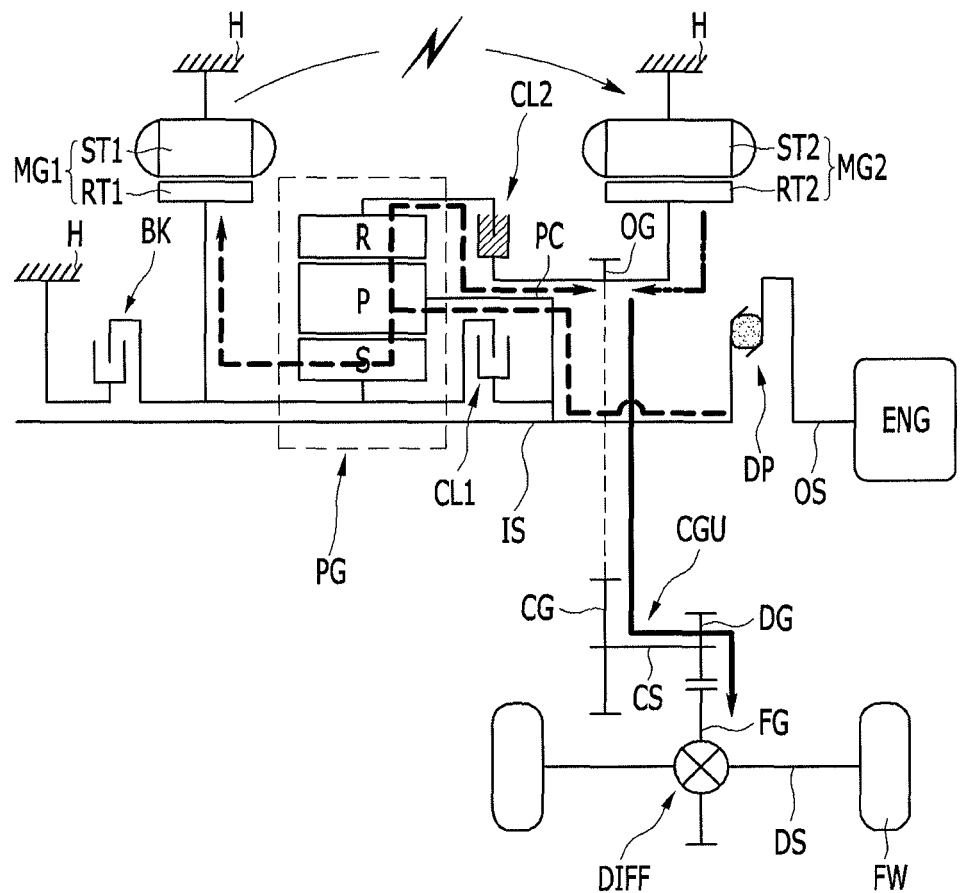
FIG. 13 is a power transmission system diagram in a power split mode of the transmission system for a driving hybrid electric vehicle according to the various exemplary embodiments of the present invention.

FIG. 13 is a power transmission system diagram in the power split mode of the transmission system for a driving hybrid electric vehicle according to the second exemplary embodiment of the present invention.

Referring to FIG. 13, in the power split mode, only the second clutch CL2 is configured to be operated.

In the power split mode, the rotating power of the engine ENG is applied as main power and the rotating power of the second motor/generator MG2 is applied as auxiliary power.

That is, the rotating power of the engine ENG is input to the planetary gear set PG through the input shaft IS and the planetary carrier PC and a portion of the rotating power input to the planetary gear set PG is transmitted to the first motor/generator MG1 through the sun gear S by a complementary operation of each rotating element of the planetary gear set PG and a portion thereof is transmitted to the output gear OG through the ring gear R which is mutual power connected by the operation of the second clutch CL2. At the same time, the rotating power of the second motor/generator MG2 is transmitted to the output gear OG as the auxiliary power.

In this case, the rotating power of the engine ENG may be involved with the generation of the first motor/generator MG1 while a torque remains. That is, in the first motor/generator MG1, the generation is made by the rotating power of the engine ENG transmitted through the planetary gear set PG and the generated electricity is supplied to the second motor/generator MG2 as driving power and the remaining electricity is charged in a battery.

In the power split mode, an electronic-continuous variable transmission is made by an output control of the second motor/generator MG2 directly transmitted to the output gear OG as the auxiliary power, along with the output of the engine ENG transmitted to the output gear OG through the ring gear R as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

Figure 14:
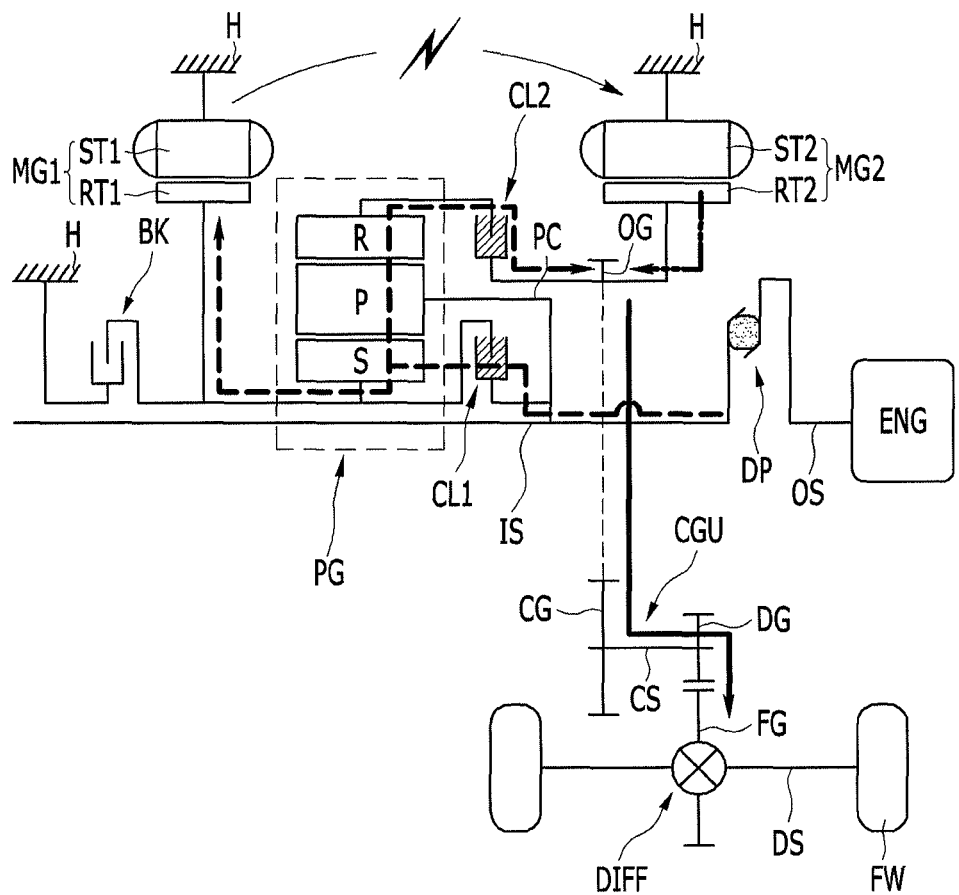
FIG. 14 is a power transmission system diagram in lock-up driving of a parallel mode of the transmission system for a driving hybrid electric vehicle according to the various exemplary embodiments of the present invention.

FIG. 14 is a power transmission system diagram in the lock-up driving of the parallel mode of the transmission system for a driving hybrid electric vehicle according to the second exemplary embodiment of the present invention.

Referring to FIG. 14, in the lock-up driving of the parallel mode, the first and second clutches CL1 and CL2 are operated.

In the lock-up driving of the parallel mode, the rotating power of the engine ENG is applied as main power and the rotating power of the second motor/generator MG2 is applied as auxiliary power.

That is, in the state in which the planetary gear set PG is locked-up by the operation of the first clutch CL1, the rotating power of the engine ENG is transmitted to the output gear OG which is power connected to the ring gear R of the planetary gear set PG by the operations of the input shaft IS, the planetary gear set PG, and the second clutch CL2 as the main power of the same speed, and at the same time, the rotating power of the second motor/generator MG2 is transmitted to the output gear OG as the auxiliary power.

In this case, a portion of the rotating power of the engine ENG is involved with the generation of the first motor/generator MG1. That is, in the first motor/generator MG1, the generation is made by the rotating power of the engine ENG transmitted through the locked-up planetary gear set PG and the generated electricity is supplied to the second motor/generator MG2 as driving power and the remaining electricity is charged in a battery.

In the lock-up driving of the parallel mode as described above, the output control of the second motor/generator MG2 directly transmitted to the output gear OG as the auxiliary power is made, along with the lock-up output of the engine ENG transmitted to the output gear OG through the input shaft IS and the locked-up planetary gear set PG as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

Figure 15:
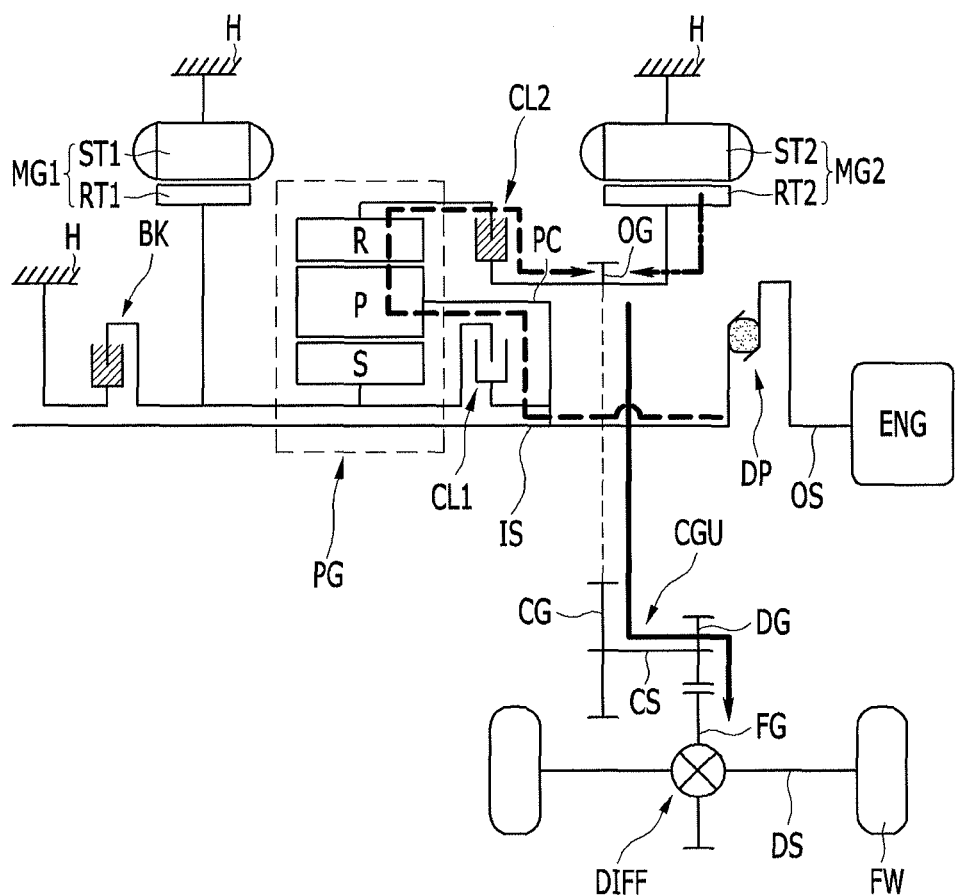
FIG. 15 is a power transmission system diagram in OD driving of a parallel mode of the transmission system for a driving hybrid electric vehicle according to the various exemplary embodiments of the present invention.
Figure 15:
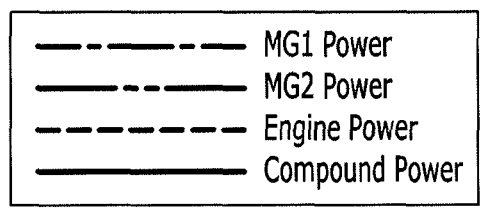

FIG. 15 is a power transmission system diagram in the OD driving of the parallel mode of the transmission system for a driving hybrid electric vehicle according to the second exemplary embodiment of the present invention.

Referring to FIG. 15, in the OD driving of the parallel mode, the second clutch CL2 and the brake BK are operated.

In the OD driving of the parallel mode, the rotating power of the engine ENG is applied as main power and the rotating power of the second motor/generator MG2 is applied as auxiliary power.

That is, by the operation of the brake BK, the rotating power of the engine ENG is input to the planetary carrier PC through the input shaft IS in the state in which in the planetary gear set PS, the sun gear S is operated as a fixed element and is increased and output by the ring gear R and the increased output is transmitted to the output gear OG power connected to the ring gear R as the main power by the operation of the second clutch CL2. At the same time, the rotating power of the second motor/generator MG2 is transmitted to the output gear OG as the auxiliary power.

In the OD driving of the parallel mode as described above, the output control of the second motor/generator MG2 directly transmitted to the output gear OG as the auxiliary power is made, along with the increased output of the engine ENG transmitted to the output gear OG through the input shaft IS and the planetary gear set PG as the main power.

As described above, the rotating power of the engine ENG and the second motor/generator MG2 which is input to the output gear OG is transmitted to the final reduction gear FG of the differential DIFF through the mid gear CG and the drive gear DG to drive the drive wheel FW.

Figure 16:
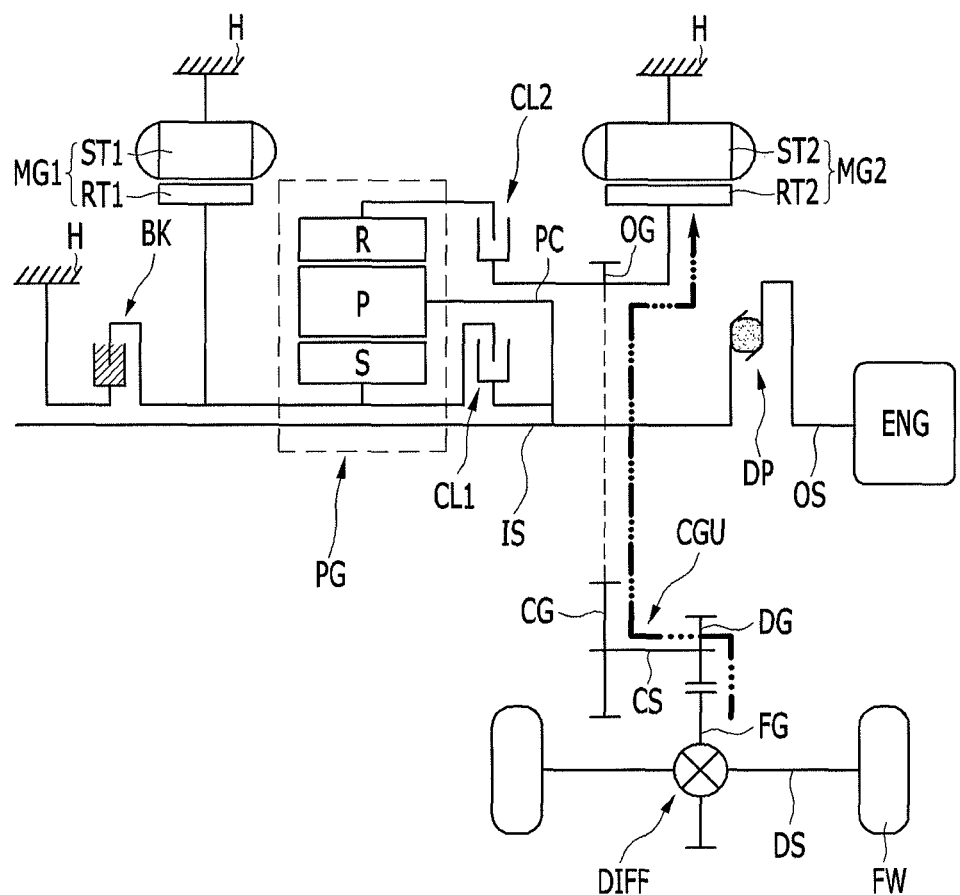
FIG. 16 is a power transmission system diagram in a regenerative braking mode of the transmission system for a driving hybrid electric vehicle according to the various exemplary embodiments of the present invention.

FIG. 16 is a power transmission system diagram in the regenerative braking mode of the transmission system for a driving hybrid electric vehicle according to the second exemplary embodiment of the present invention.

Referring to FIG. 16, like the EV mode, in the regenerative braking mode, all of the first and second clutches CL1 and CL2 and the brake BK are configured not to be operated.

That is, in the regenerative braking mode, the regenerative power which is input from the drive wheel FW is transmitted to the second motor/generator MG2 through the final reduction gear FG of the differential DIFF, the driving gear DG, the mid gear CG, and the output gear to drive the second motor/generator MG2, thereby performing the generation.

As described above, the second motor/generator MG2 is operated as the generator only in the regenerative braking mode.

According to the exemplary embodiments of the present invention, the EV mode, the power split mode, and the parallel mode of the lock-up and OD driving are implemented by using the one clutch and the one brake to improve the low-speed driving and high-speed driving efficiency and the engine power is widely used from a middle speed to a high speed to increase the driving efficiency in the overall section, thereby maximizing the improvement of the fuel efficiency.

Further, the capacity of the first motor/generator may be reduced by using the power split mode, thereby saving the production cost.

Further, the clutch blocking the power of the second motor/generator is additionally applied to simultaneously implement the continuous mode in addition to the power split mode and the parallel mode, thereby maximizing the improvement of fuel efficiency and implementing the regenerative braking at the time of the inertial driving.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A transmission system for a hybrid electric vehicle, comprising:
    an input shaft connected to an output side of an engine;
    first and second motors/generators having a function of a motor and a generator and mounted to a transmission housing;
    a planetary gear set disposed on the input shaft and including three rotating elements having:
        a first rotating element directly connected to the first motor/generator and selectively connected to the input shaft and the transmission housing;
        a second rotating element directly connected to the input shaft; and
        a third rotating element connected to an output gear and connected to the second motor/generator; and
    a connection unit disposed so as to perform that the first rotating element is selectively connected to the input shaft or the transmission housing,
    wherein the third rotating element is selectively connected to the output gear and the second motor/generator, and
    wherein the planetary gear set is a single pinion planetary gear set and includes:
        a sun gear as the first rotating element;
        a planetary carrier as the second rotating element; and
        a ring gear as the third rotating element.

2. The transmission system for the hybrid electric vehicle of claim 1, wherein the connection unit includes:
    a first clutch disposed between the first rotating element of the planetary gear set and the input shaft; and
    a brake disposed between the first rotating element of the planetary gear set and the transmission housing.

3. The transmission system for the hybrid electric vehicle of claim 2,
    wherein operations of the first clutch and the brake are released in an electric vehicle (EV) mode, a starting of the engine, and a power split mode,
    wherein only the first clutch in a lock-up driving of a parallel mode is operated, and
    wherein only the brake in an overdrive (OD) driving of the parallel mode is operated.

4. The transmission system for the hybrid electric vehicle of claim 1, wherein the connection unit includes:
    a first clutch disposed between the first rotating element of the planetary gear set and the input shaft;
    a second clutch disposed between the third rotating element of the planetary gear set and the output gear; and
    a brake disposed between the first rotating element of the planetary gear set and the transmission housing.

5. The transmission system for the hybrid electric vehicle of claim 4, wherein, in the connection unit,
    all operations of the first and second clutches and the brake are released in an electric vehicle (EV) mode and a regenerative braking mode,
    only the first clutch is operated in a starting of the engine and a continuous mode,
    only the second clutch is operated in a power split mode,
    the first and second clutches are operated in a lock-up driving of a parallel mode, and
    the second clutch and the brake are operated in an overdrive (OD) driving of the parallel mode.

6. The transmission system for the hybrid electric vehicle of claim 1, further comprising:
    a reduction gear unit disposed on a midshaft disposed in parallel with the input shaft to reduce and transmit a rotating power transmitted from the output gear to a differential between the output gear and a final reduction gear of the differential.

7. The transmission system for the hybrid electric vehicle of claim 6, wherein the reduction gear unit includes:
    the midshaft disposed in parallel with the input shaft between the input shaft and the differential;
    a mid gear disposed on the midshaft to be externally engaged to the output gear; and
    a drive gear disposed on the midshaft to be externally engaged to the final reduction gear of the differential.

8. A transmission system for a hybrid electric vehicle, comprising:
    an input shaft connected to an output side of an engine;
    first and second motors/generators having a function of a motor and a generator and mounted to a transmission housing;
    a planetary gear set disposed on the input shaft and including:
        a sun gear directly connected to the first motor/generator and selectively connected to the input shaft or the transmission housing;
        a planetary carrier directly connected to the input shaft; and
        a ring gear connected to an output gear and connected to the second motor/generator;
    a connection unit disposed at a selective connection part; and a reduction gear unit disposed on a midshaft disposed in parallel with the input shaft to reduce and transmit a rotating power transmitted from the output gear to a differential between the output gear and a final reduction gear of the differential, wherein the ring gear is selectively connected to the output gear and the second motor/generator.

9. The transmission system for the hybrid electric vehicle of claim 8, wherein the connection unit includes:
  a first clutch disposed between the sun gear of the planetary gear set and the input shaft; and
  a brake disposed between the sun gear of the planetary gear set and the transmission housing.

10. The transmission system for the hybrid electric vehicle of claim 9, wherein in the connection unit,
  operations of the first clutch and the brake are released in an electric vehicle (EV) mode, a starting of the engine, and a power split mode,
  only the first clutch is operated in a lock-up driving of a parallel mode, and
  only the brake is operated in an overdrive (OD) driving of the parallel mode.

11. The transmission system for the hybrid electric vehicle of claim 8, wherein the connection unit includes:
  a first clutch disposed between the sun gear of the planetary gear set and the input shaft; and
  a second clutch disposed between the ring gear of the planetary gear set and the output gear; and
  a brake disposed between the sun gear of the planetary gear set and the transmission housing.

12. The transmission system for the hybrid electric vehicle of claim 11, wherein, in the connection unit,
  all operations of the first and second clutches and the brake are released in an electric vehicle (EV) mode and a regenerative braking mode,
  only the first clutch is operated in a starting of the engine and a continuous mode,
  only the second clutch is operated in a power split mode,
  the first and second clutches are operated in a lock-up driving of a parallel mode, and
  the second clutch and the brake are operated in an overdrive (OD) driving of the parallel mode.

13. The transmission system for the hybrid electric vehicle of claim 8, wherein the reduction gear unit includes:
  the midshaft disposed in parallel with the input shaft between the input shaft and the differential;
  a mid gear disposed on the midshaft to be externally engaged to the output gear; and
  a drive gear disposed on the midshaft to be externally engaged to the final reduction gear of the differential.

14. A transmission system for a hybrid electric vehicle, comprising:
  an input shaft connected to an output side of an engine;
  first and second motors/generators having a function of a motor and a generator and disposed in a transmission housing;
  a planetary gear set disposed on the input shaft and including:
    a sun gear directly connected to the first motor/generator and selectively connected to the input shaft or the transmission housing;
    a planetary carrier directly connected to the input shaft; and
    a ring gear connected to an output gear and connected to the second motor/generator;
  a first clutch disposed between the sun gear of the planetary gear set and the input shaft;
  a brake disposed between the sun gear of the planetary gear set and the transmission housing;
  a reduction gear unit disposed on a midshaft disposed in parallel with the input shaft to reduce and transmit a rotating power transmitted from the output gear to a differential between the output gear and a final reduction gear of the differential; and
  a second clutch disposed between the ring gear and the output gear so that the ring gear of the planetary gear set is selectively connected to the output gear and the second motor/generator to implement a driving mode which includes an electric vehicle (EV) EV mode, a starting of the engine, a power split mode, a continuous mode, a lock-up driving and an overdrive (OD) driving of a parallel mode, and a regenerative braking mode,
  whereby the driving mode including the electric vehicle (EV) mode, the power split mode, and the lock-up driving and the overdrive (OD) driving of the parallel mode is implemented.

15. The transmission system for the hybrid electric vehicle of claim 14,
  wherein operations of the first clutch and the brake are released in the EV mode and the power split mode,
  wherein only the first clutch is operated in the lock-up driving of the parallel mode, and
  wherein only the brake is operated in the OD driving of the parallel mode.

16. The transmission system for the hybrid electric vehicle of claim 14,
  wherein all operations of the first and second clutches and the brake are released in the EV mode and the regenerative braking mode,
  wherein only the first clutch is operated in the starting of the engine and the continuous mode,
  wherein only the second clutch is operated in the power split mode,
  wherein the first and second clutches are operated in the lock-up driving of the parallel mode, and
  wherein the second clutch and the brake are operated in the OD driving of the parallel mode.

17. The transmission system for the hybrid electric vehicle of claim 14, wherein the reduction gear unit includes:
  the midshaft disposed in parallel with the input shaft between the input shaft and the differential;
  a mid gear disposed on the midshaft to be externally engaged to the output gear; and
  a drive gear disposed on the midshaft to be externally engaged to the final reduction gear of the differential.

* * * * *